(12) United States Patent
Gurganian

(10) Patent No.: US 9,304,142 B1
(45) Date of Patent: Apr. 5, 2016

(54) ENERGY HARVESTING ZERO-SPEED SENSOR DEVICE, METHOD AND SYSTEM

(71) Applicant: A. Steve Gurganian, Yorba Linda, CA (US)

(72) Inventor: A. Steve Gurganian, Yorba Linda, CA (US)

( * ) Notice: Subject to any disclaimer, the term of this patent is extended or adjusted under 35 U.S.C. 154(b) by 348 days.

(21) Appl. No.: 13/797,980

(22) Filed: Mar. 12, 2013

(51) Int. Cl.
| | |
|---|---|
| *G01P 3/44* | (2006.01) |
| *G01P 1/04* | (2006.01) |
| *G01P 1/02* | (2006.01) |
| *G01P 3/54* | (2006.01) |
| *G01P 3/487* | (2006.01) |

(52) U.S. Cl.
CPC . *G01P 1/04* (2013.01); *G01P 1/026* (2013.01); *G01P 3/487* (2013.01); *G01P 3/54* (2013.01)

(58) Field of Classification Search
CPC ............ G01P 3/488; G01P 3/54; G01P 3/44; G01P 3/22; G01P 3/487; G01P 1/026; G01P 1/08; G01P 1/07; G01P 1/04; B60C 23/0411; B60C 23/0493; B60C 23/0433; B60C 23/0452; B60C 23/0442; B60C 23/041; B60C 23/0413
USPC ............................ 73/488, 491, 493, 494, 495; 324/173–174, 207.11–207.17, 324/207.21–207.25
See application file for complete search history.

(56) References Cited

U.S. PATENT DOCUMENTS

| | | | |
|---|---|---|---|
| 3,365,615 A | 1/1968 | Bart | |
| 3,760,189 A | 9/1973 | Jones | |
| 3,898,563 A * | 8/1975 | Erisman | 324/166 |
| 5,067,350 A | 11/1991 | Grillo et al. | |
| 5,562,787 A * | 10/1996 | Koch et al. | 156/64 |
| 5,585,560 A | 12/1996 | Goossens | |
| 5,602,335 A | 2/1997 | Ouchi | |
| 5,756,894 A | 5/1998 | Paolo et al. | |
| 5,821,422 A | 10/1998 | Ouchi | |
| 6,892,587 B2 * | 5/2005 | Mizutani et al. | 73/862.193 |
| 7,138,911 B2 * | 11/2006 | Tyndall | 340/447 |
| 7,161,476 B2 * | 1/2007 | Hardman et al. | 340/442 |
| 7,558,695 B2 * | 7/2009 | Calderone et al. | 702/142 |
| 8,035,498 B2 * | 10/2011 | Pennisi | 340/441 |
| 8,193,926 B2 * | 6/2012 | Sinnett et al. | 340/443 |
| 8,525,658 B2 * | 9/2013 | Hirabayashi et al. | 340/447 |
| 8,841,785 B2 * | 9/2014 | Theuss et al. | 290/1 R |
| 2004/0134266 A1 * | 7/2004 | Schroeder et al. | 73/117.3 |
| 2004/0211250 A1 * | 10/2004 | Adamson et al. | 73/146 |
| 2005/0087019 A1 * | 4/2005 | Face | 73/649 |
| 2005/0140357 A1 | 6/2005 | Takizawa et al. | |
| 2005/0156590 A1 * | 7/2005 | Nagae | 324/167 |
| 2006/0049822 A1 | 3/2006 | Watson | |
| 2008/0047363 A1 * | 2/2008 | Arms et al. | 73/862 |
| 2008/0129549 A1 * | 6/2008 | Farkas et al. | 341/11 |
| 2008/0289407 A1 * | 11/2008 | Gramling et al. | 73/146.5 |
| 2008/0307900 A1 * | 12/2008 | Paul et al. | 73/862.193 |
| 2009/0260438 A1 * | 10/2009 | Hedtke | 73/579 |
| 2010/0147061 A1 * | 6/2010 | Weston | 73/146 |
| 2012/0156034 A1 * | 6/2012 | Sabannavar et al. | 416/1 |
| 2012/0255349 A1 * | 10/2012 | Pop et al. | 73/146.5 |
| 2012/0293115 A1 * | 11/2012 | Ramsesh | 320/108 |
| 2012/0319866 A1 * | 12/2012 | Svoen et al. | 340/870.39 |
| 2013/0187636 A1 * | 7/2013 | Kast et al. | 324/127 |

* cited by examiner

*Primary Examiner* — Helen Kwok
(74) *Attorney, Agent, or Firm* — Sci-Law Strategies, P.C.

(57) ABSTRACT

This invention provides an angular speed detection and monitoring system comprised of an energy harvesting integrated generator and sensor with wireless data transmission capability, a wireless data relay station and a wireless remote termination station for control wiring connections and digital communications. The invention provides real-time rotational acceleration and speed measurement for continuous process control and 'Zero-Speed' detection for simple on-off interlock control and fault monitoring of rotating equipment or moving surfaces.

20 Claims, 7 Drawing Sheets

ENERGY HARVESTING ZERO-SPEED SENSOR DEVICE, METHOD AND SYSTEM

FIELD OF THE INVENTION

This invention involves a stand-alone device which converts rotational mechanical energy into electrical energy for internal use without need of externally supplied power or a stationary ancillary component to measure rotational speed. The invention transmits speed data wirelessly for processing.

BACKGROUND OF THE INVENTION

Industrial and commercial batch and continuous process manufacturing systems often use equipment with rotational components for product conveyance and fabrication. It is critical to insure moving equipment in the process stream is functioning as required such that dependent upstream machine(s) may safely and correctly deliver product to successive processing lines or equipment. The attachment of sensors that monitor the rotational movement and speed of process equipment is commonplace where incorrect speed, or a full stop of rotation, indicates a material delivery fault that must be addressed. The managing of speed faults may be provided by hardwired interlock connections, or by process computer controlled decision making, which ultimately affect the operation of dependent equipment in the process stream.

Current rotational monitors are normally comprised of two required components: a target fixture and an externally powered sensor/detector device. Two typical arrangements are:

1) a target fixture of ferrous or magnetic construction that is attached to the rotating component, and a separate hardwired proximity sensor using inductive or Hall Effect circuitry to detect the target.

2) a target fixture attached to the rotating component that is fabricated to provide one or more optical occlusions that are detected by a separate hardwired photo-sensitive sensor.

There are two inherent problems with these monitor types:

1) The sensor must be mounted to a stationary reference fixture separately from the rotating target. The spacing (gap) between the sensor and target is critical. This configuration is intolerant of deviations to the gap distance and the gap is subject to blockage by debris.

2) When one or more instances of conventional monitor installations are used, each instance requires the user to provide and distribute dedicated operating power and signal wiring to the monitor locations to integrate the sensor(s) into an overall control system.

SUMMARY OF THE INVENTION

In one embodiment of the present invention, an angular speed detection and monitoring system is comprised of a single mechanical attachment point energy harvesting integrated generator and sensor unit with wireless data transmission capability and a wireless remote termination station for control wiring connections and digital communications. In one embodiment of the invention, a wireless data relay station provides for improved digital communications as may be needed. Other embodiments of the invention provide real-time rotational acceleration and speed measurement data for continuous process control and 'Zero-Speed' detection for simple on-off interlock control and fault monitoring of rotating equipment or moving surfaces.

In various embodiments of the present invention, a self-powered integrated single component rotational sensor unit attaches directly to a rotating component or moving surface of the equipment to be monitored. In one embodiment of the invention, the sensor unit derives electrical power by harvesting energy from the rotating machine or moving surface the component it is attached to. The integrated sensor unit provides its data to a remote receiving device wirelessly, eliminating the need for a fixed non-rotating secondary detector at the installation site and the need to provide power or signal wiring to the detector location.

In one embodiment of the invention, the integrated single component rotational sensor unit is housed in a protective cover and, as such, eliminates the risk of interference by debris and difficulties of aligning target/sensor combinations.

In one embodiment of the invention, multiple sensors can be installed within the wireless transmitter range, eliminating the need for supply power distribution, measured speed signal, or other control wiring to any and all monitored locations.

In another embodiment of the invention, the receiving device contains communication circuitry that monitors rotational speed from one or more wireless sensor assemblies, and provides real-time speed data that can be used for equipment fault determination and/or overall process control.

BRIEF DESCRIPTION OF THE DRAWINGS

This invention is described with respect to specific embodiments thereof. The present invention is described with reference to the accompanying drawings. In the drawings, like reference numbers indicate identical or functionally similar elements. Additionally, the left-most digit(s) of a reference number identifies the drawing in which the reference number first appears. Additional features can be appreciated from the Figures in which.

DETAILED DESCRIPTION OF THE INVENTION

Definitions

Figure 1A:
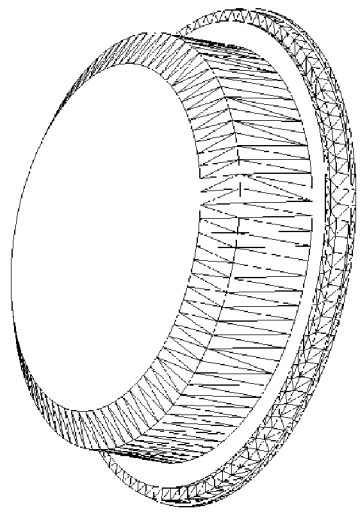
FIG. 1A is a perspective view of a Speed Detection Unit assembly of the present invention.

The transitional term "comprising" is synonymous with "including," "containing," or "characterized by," is inclusive or open-ended and does not exclude additional, unrecited elements or method steps.

The transitional phrase "consisting of" excludes any element, step, or ingredient not specified in the claim, but does not exclude additional components or steps that are unrelated to the invention such as impurities ordinarily associated with a composition.

The transitional phrase "consisting essentially of" limits the scope of a claim to the specified materials or steps and those that do not materially affect the basic and novel characteristic(s) of the claimed invention. In the following description, various aspects of the present invention will be described. However, it will be apparent to those skilled in the art that the present invention may be practiced with only some or all aspects of the present invention. For purposes of explanation, specific numbers, materials, and configurations are set forth in order to provide a thorough understanding of the present invention. However, it will be apparent to one skilled in the art that the present invention may be practiced without the specific details. In other instances, well-known features are omitted or simplified in order not to obscure the present invention.

Various operations will be described as multiple discrete steps in turn, in a manner that is most helpful in understanding the present invention; however, the order of description should not be construed as to imply that these operations are necessarily order dependent.

Various embodiments will be illustrated in terms of exemplary classes and/or objects in an object-oriented programming paradigm. It will be apparent to one skilled in the art that the present invention can be practiced using any number of different classes/objects, not merely those included here for illustrative purposes. Furthermore, it will also be apparent that the present invention is not limited to any particular software programming language or programming paradigm.

It should be noted that references to 'an' or 'one' embodiment in this disclosure are not necessarily to the same embodiment, and such references mean at least one.

As used herein, the term "Speed Detection Unit" refers to a self-contained single mechanical reference attachment point energy harvesting electro-mechanical mechanism with bi-directional transmission capabilities which is designed to sense and monitor speed and/or acceleration of a mechanical component. In one embodiment, the Speed Detection Unit contains an internal, rechargeable battery or power storage device to power the Unit when the mechanical rotational component is at rest or near zero-speed.

As used herein, the term "harvesting energy" refers to electrical power generated in using the motion of the mechanical rotational component by the Speed Detection Unit. In one embodiment of the invention, the electrical power is generated by electromagnetic induction with internal wire coils and magnets.

As used herein, the term "Remote Termination Station" refers to a base station equipped with a user interface, bi-directional wireless transceivers and wired connections, and powered by an external power source. In one embodiment, the station receives feedback from the Speed Detection Unit and, after processing the feedback, wirelessly sends data, commands and operation parameters to other equipment.

As used herein, the term "Data Relay Station" refers to bi-directional wireless repeaters, store-and-forward techniques, and peer-to-peer transmission systems which are used to extend out of range or obscured data transmissions.

As used herein, the term "external power" refers to electrical power generated by an independent source not provided by a component of the invention.

As used herein, the term "zero-speed" refers to the cessation of speed i.e., the speed of an object at rest.

As used herein, the phrase "connected directly" refers to an attachment between two items axially or radially with fastening hardware where the attachment insures that each item moves uniformly with reference to each other.

As used herein, the phrase "built-in circuitry" refers to analog or digital circuits, with or without a processor, that perform computational functions and support the transmission and reception of radio frequency transmission for the conveyance of data.

As used herein, the term "internal battery" refers to an energy storage device.

As used herein, the phrase "stand-alone device" refers to a device which operates without the need for externally supplied power or a stationary ancillary component

Speed Detection Unit

Figure 1B:
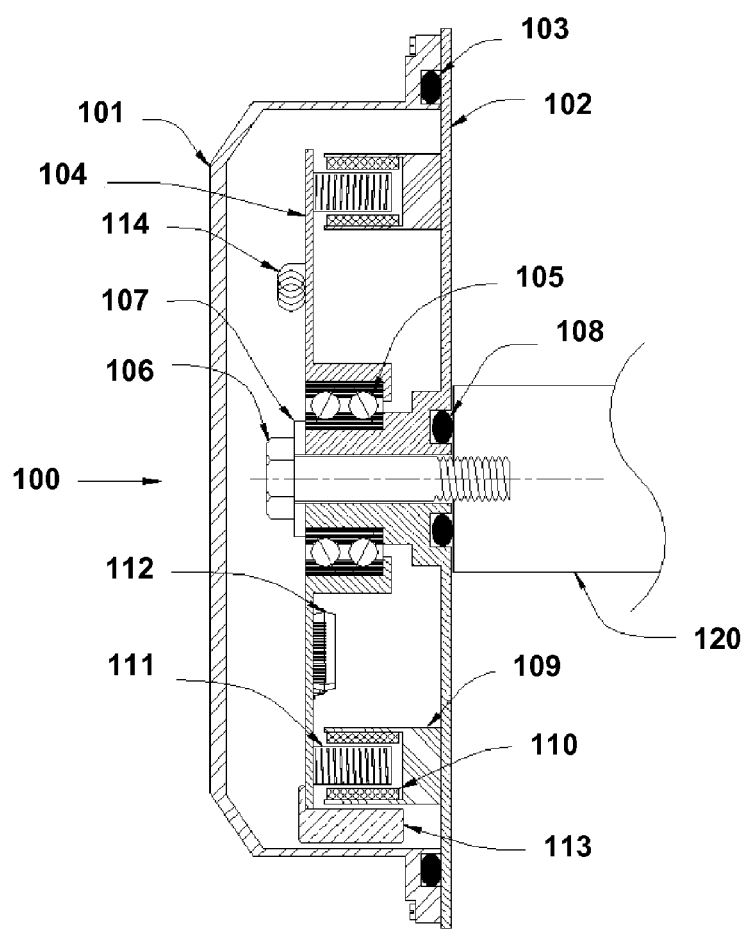
FIG. 1B is a sectional view of a Speed Detection Unit assembly according to an embodiment of the present invention.

In one embodiment of the present invention, a Speed Detection Unit 100 is comprised of three primary parts: a rotating hub 102 that attaches to the rotating component 120 to be monitored, a generator disc 104 that harvests energy from and senses the speed of the monitored rotating component 120, and a cover 101 that encloses the generator disc 104 to the rotating hub 102. The entire unit is sealed from environmental contaminants by the placement of the Hub to Cover Seal 103 and the Hub Seal 108. The Speed Detection Unit 100 is attached to the rotating component 120 using the Connecting Fastener 106 which simultaneously holds the bearing 105 in position using the Bearing Retainer 107. See FIGS. 1A and 1B.

In an embodiment of the invention, the generator disc 104 acts as a stator and is attached to the rotating hub 102, the rotor, using a bearing assembly 105 to isolate it from the rotational movement of the rotating hub 102 when the monitored rotating component 120 rotates. A counter weight 113 is attached to the generator disc 104 stator to overcome bearing assembly 105 drag forces and back EMF (electro-motive force) ultimately produced by the internal generator multi-winding coils 111 and magnet pairs 110. Counter weight 113 maintains a fixed orientation of the generator disc 104 stator, in relation to the rotating hub 102 rotor, using inertial and gravitational forces to hold generator disc 104 in a steady position. The combinational use of the bearing 105 and counter weight 113 creates a pseudo fixed (non-rotating) reference within the enclosed rotating system of the speed detection unit 100.

In an unexpected result, it was discovered that a stationary mechanical reference can be created within a rotating device. Previously it was considered a minimum requirement that all generators include two physical attachment points, one stationary (for the stator) and one rotating (for the rotor). In an embodiment of the present invention, it was found that a unit can provide both fixed and rotational reference points using only one physical connection.

Figure 2:
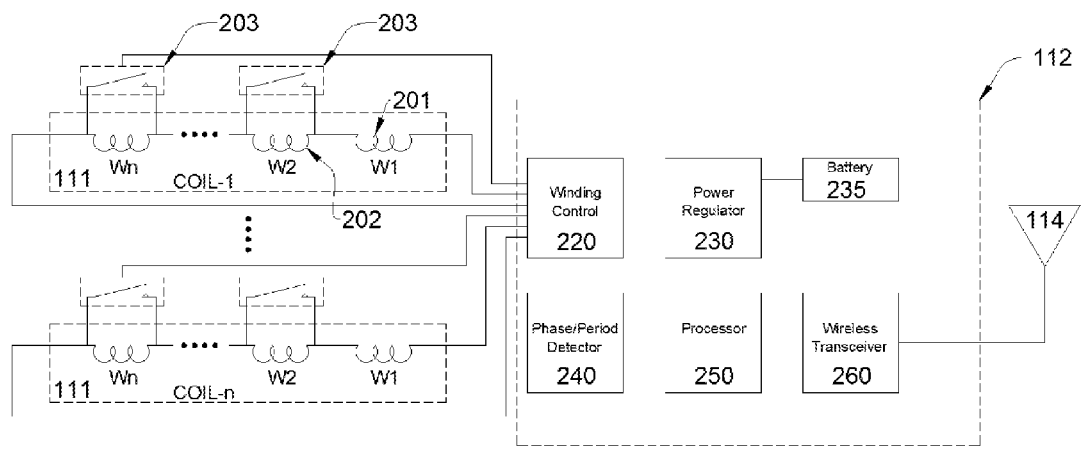
FIG. 2 is a diagram showing of a Speed Detection Unit circuitry according to an embodiment of the present invention.
Figure 6A:
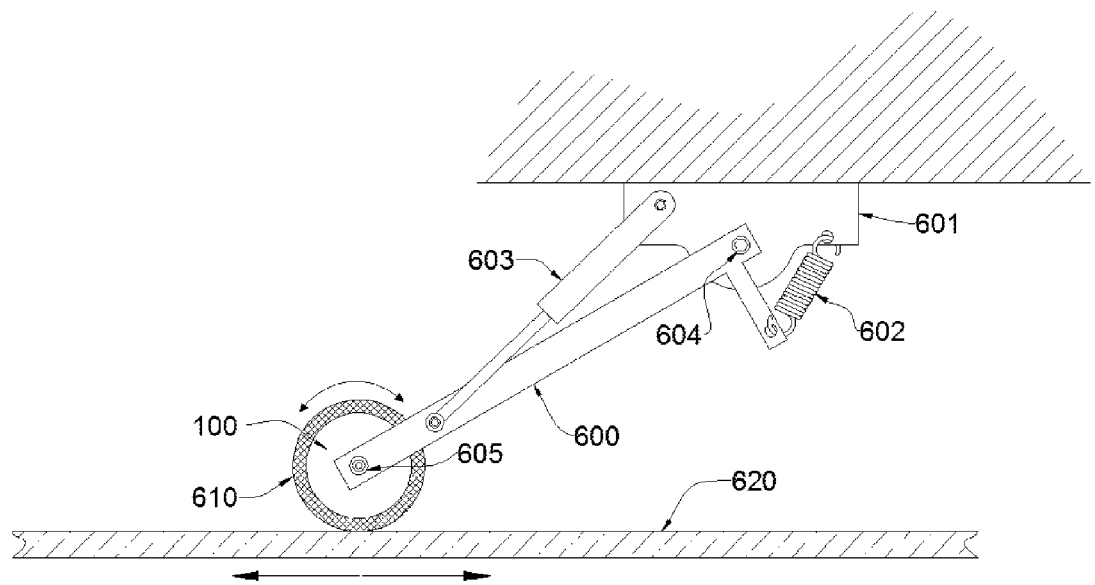
FIG. 6A is a side view of a sensor idler arm showing linear movement according to an embodiment of the present invention.
Figure 6B:
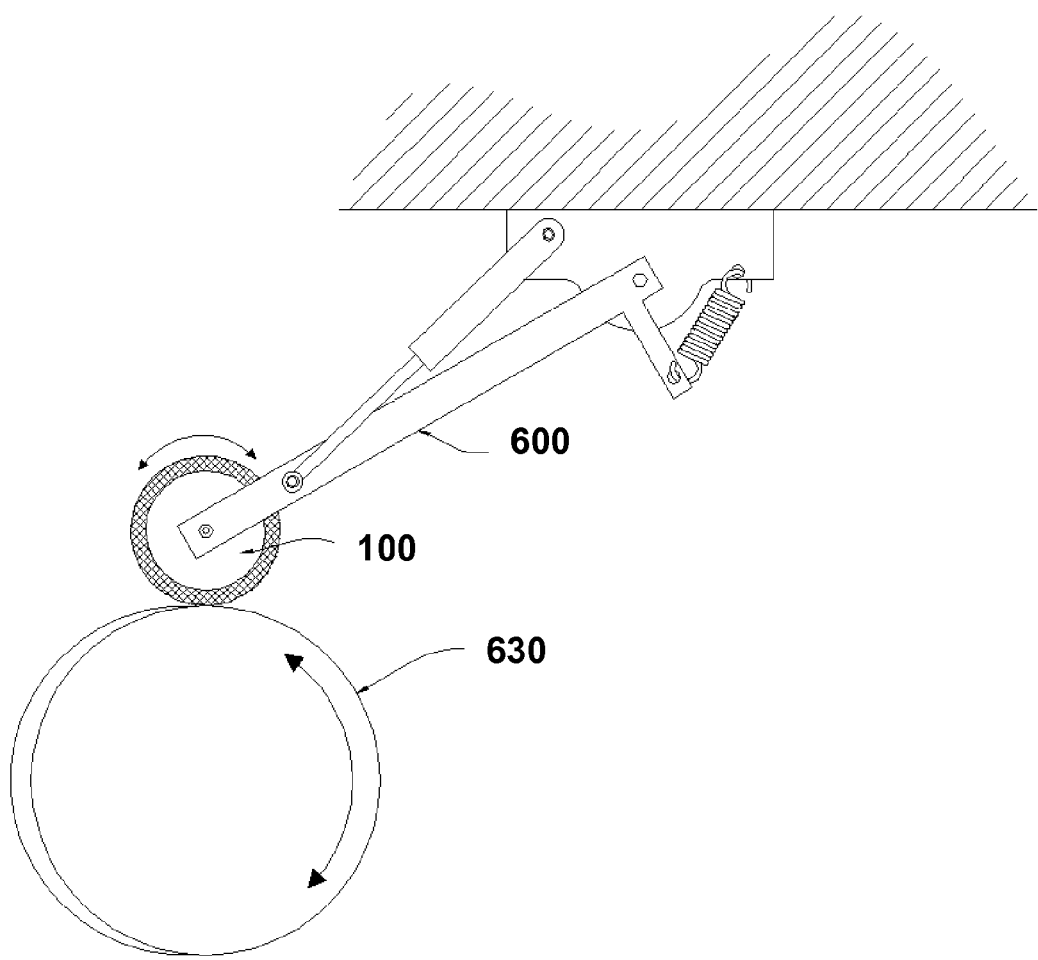
FIG. 6B is a side view of a sensor idler arm showing rotational movement according to an embodiment of the present invention.

In an embodiment of the invention, FIG. 2 shows the internal circuitry 112 of the Speed Detection Unit 100 comprising multi-winding coil 111; circuit blocks for winding control 220, generator power regulation and rectification 230, and generator voltage phase and period measurement 240; a processor for the Speed Detection Unit 250 connected to a rechargeable battery; and wireless transceiver 260 for communication with an antenna 114. In an embodiment of the invention, the Speed Detection Unit 100, when rotating, is self-powered using the harvested energy from the rotational component to operate the internal circuitry that monitors and measures the angular speed of the monitored rotating component 120. In an embodiment of the invention, the Speed Detection Unit 100 is attached to the monitored rotating component 120 such that the Speed Detection Unit 100 rotates with the monitored rotating component 120. In another embodiment of the invention, the Speed Detection Unit 100 is also independently mounted on an idler arm 600 that allows for the free rotation of the Speed Detection Unit 100 when its perimeter is placed against a moving surface 620 as shown in FIG. 6. When the monitored rotating component 120 rotates or the moving surface forces the rotation of Speed Detection Unit 100, the Speed Detection Unit 100 harvests energy from the rotational movement by electromagnetic induction with the internal generator disc 104 and magnet pairs 110 of the hub 102 to produce electrical power.

In an embodiment of the invention, the multi-winding coil 111 is constructed with one or a plurality of winding taps that provide segmentation of the overall winding length and number of turns. In another embodiment of the invention, the multi-winding coil 111 is constructed with a Primary Winding 201 and a Secondary Winding 202 with the same or differing number of coil turns with independent electrical connections for each winding. In another embodiment of the invention, the Winding Bypass 203 is used to add or subtract the effective winding length and number of coil turns of the multi-winding coil 111 to change the magnetic field strength produced in conjunction with the magnet pairs 110, as shown in FIG. 2.

Figure 1C:
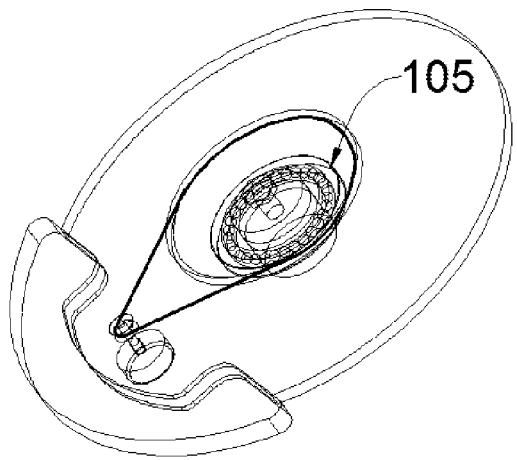
FIG. 1C is a perspective view of a Speed Detection Unit assembly according to an embodiment of the present invention.
Figure 1D:
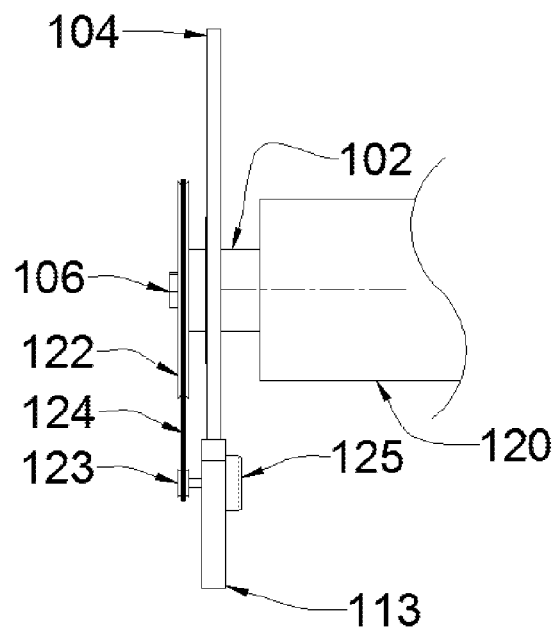
FIG. 1D is a sectional view of a Speed Detection Unit assembly according to an embodiment of the present invention.

In an embodiment of the invention, harvested energy is provided by the translation of rotational movement to the rotor (armature) of an electrical power generator device 125 attached to the generator disc 104. The rotational movement of the rotating component 120 is applied to the generator device 125 using a drive pulley 122 connected to the rotating hub 102 which then turns generator pulley 123 through drive belt 124. The body (stator) of the generator device 125 is held stationary, opposing the applied rotating drive, where Counter weight 113 maintains a fixed orientation of the generator disc 104, in relation to the rotating hub 102 rotor, using inertial and gravitational forces to hold generator disc 104 in a steady position. In another embodiment of the invention, the generator device 125 may be direct current (DC) or alternating current (AC) type. See FIGS. 1C and 1D.

The Speed Detection Unit 100 is aligned with the axis of rotation of the monitored rotating component 120 and is coupled to the monitored rotating component 120 to ensure the two will items will rotate uniformly. If the Speed Detection Unit 100 is placed on a moving surface, contact between the rotating hub 102 and the surface will force a rotation of the hub 102. When attached to a monitored rotating component 120 or surface, the rotating hub 102 and the cover 101 will rotate at the same rate as the monitored rotating component 120 or proportionally to the speed of the moving surface; but the generator disc 104 will remain stationary due to the mechanical isolation afforded by the bearing assembly 105 and the inertia of the counter weight 113.

In an embodiment of the invention, the dynamic relationship between the rotating hub 102 and the stationary generator disc 104 insures that the magnet holders 109 and magnet pairs 110 will travel past each multi-winding coil 111 for every revolution of the rotating hub 102. Through electromagnetic induction, motional EMF (electro-motive force) is produced at the multi-winding coils 111 each time the magnetic field created by magnet pairs 110 rotates past the multi-winding coils 111.

Figure 3:
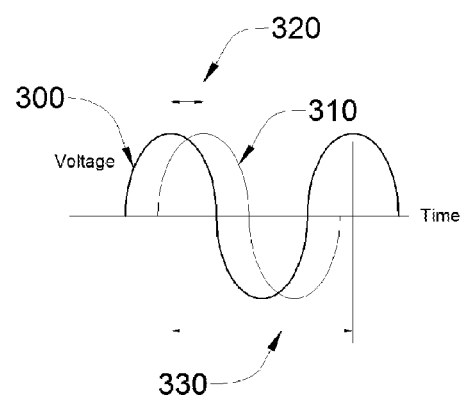
FIG. 3 is a graph showing the relationship between the coil voltage phase and waveform time period of the present invention.

In another embodiment of the invention, FIG. 2 shows the graphical representation of the EMF energy created by the rotating magnet/coil effect is monitored by the winding control circuit block 220 to control the magnitude of the effective voltage, with the generator power regulator 230 circuitry ultimately providing a constant DC power supply for use by remaining sensor circuit blocks 240, 250 and 260. When rotating with sufficient power harvesting, the internal circuitry of the Speed Detection Unit 100 activates and will measure angular velocity and acceleration by integrating the electrical pulses at Coil-1 300 through Coil-n 310 generated at the multi-winding coils 111. Coil voltage phase difference 320 and pulse rate 330 are used to determine rotational direction and speed respectively. See FIG. 3. The Speed Detection Unit 100 will periodically transmit a wireless RF digital signal of the monitored angular speed and direction of rotation to a Remote Termination Station 400; either directly or in conjunction with a Data Relay Station 500 if used.

Remote Termination Station and Data Relay Station

In an embodiment of the invention, the measured speed is then transmitted using radio frequency (RF) wireless communication transceiver 260 for reception by a Remote Termination Station 400. External alarm connections in conjunction with speed detection and direction outputs 416, 417 and analog speed signals 413 generated at the Remote Termination Station 400 provide verification of rotational status to determine if a zero-speed (no rotation) condition exists at the Speed Detection Unit 100 and the actual speed (rpm) of the monitored rotating component 120. The signals generated at the Remote Termination Station 400 are then used by other equipment for status and alarm purposes. Status from the speed detection and direction outputs 416, 417 and analog speed signals 413 are provided to other equipment using wired or wireless means. See FIG. 4.

In one embodiment of the invention, wired connections supply conventional relay contact closures for status and standardized voltage/current analog speed signals. Digital representations of the status and speed signals are delivered as serial data by wired data communication circuitry 414 and wirelessly by WiFi transceiver 418. A single Remote Termination Station 400 provides wired and wireless termination for one or more Speed Detection Units 100.

Figure 4:
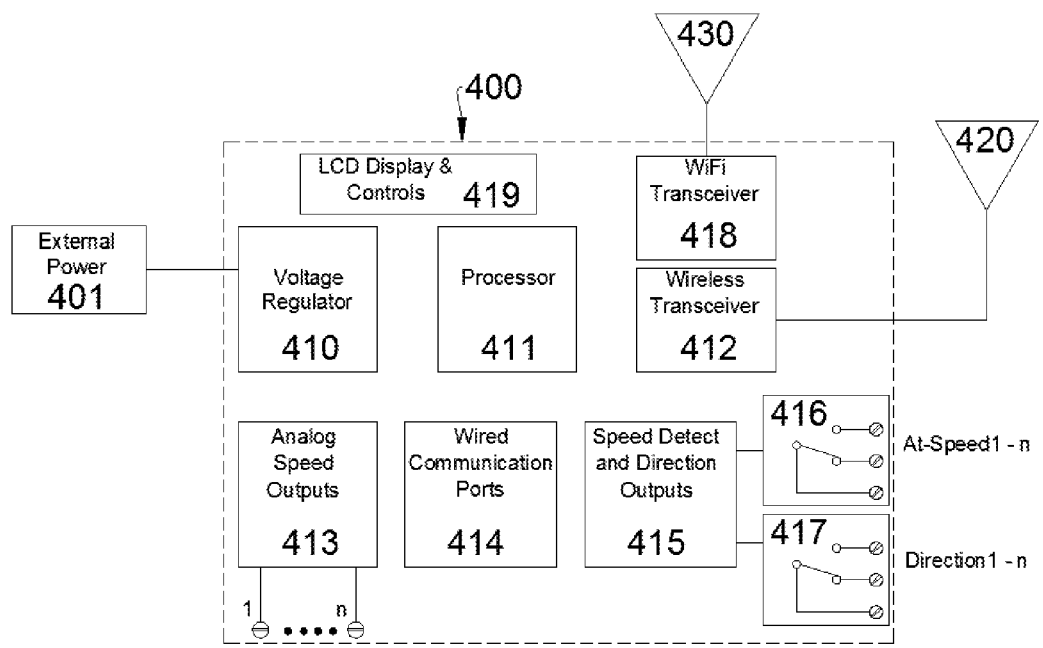
FIG. 4 is a diagram of a Remote Termination Station according to an embodiment of the present invention.

In an embodiment of the invention the Remote Termination Station 400 is externally powered by either AC or DC power sources 401 as shown in FIG. 4. User interface is provided by a graphical/text display and controls 419 for system configuration and status indication. Circuit blocks for voltage regulation 410, a Remote Termination Station processor 411, and communications for wired data circuitry 414, wireless transceiver 412 and WiFi 418 transceiver with their respective antennae 420, 430 are provided to support the exchange of data with Speed Detection Unit(s) 100 and wireless Ethernet devices. Provisions for external output signal generation are provided by analog speed signal circuit 413 and zero-speed detection and direction circuit 415. Speed detection output status 416 and rotational direction signal 417 interfaces are provided for use by external equipment.

Figure 5:
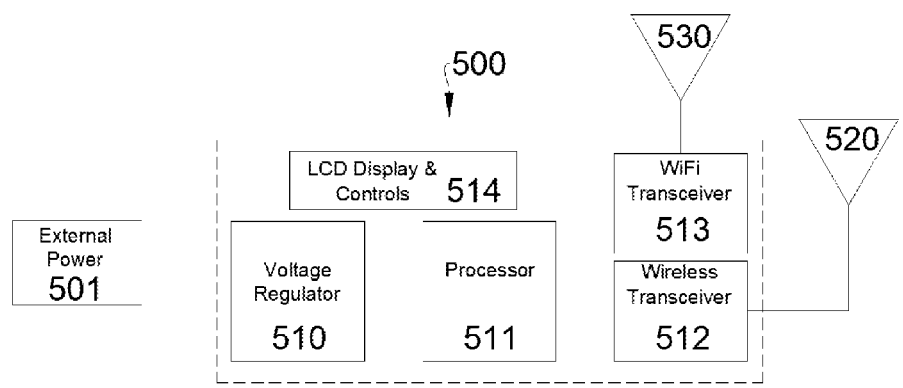
FIG. 5 is a diagram of a Data Relay Station according to an embodiment of the present invention.

In an embodiment of the invention, a Data Relay Station 500 is externally powered by either AC or DC power sources 501 as shown in FIG. 5. User interface is provided by a graphical/text display and controls 514 for the station configuration and status indication. Circuit blocks for voltage regulation 510, a remote station processor 511, and wireless transceiver for communication 512 are provided to relay and exchange wireless data between the Speed Detection Unit(s) 100 and a Remote Termination Station 400. WiFi communications circuit block 513 supports Ethernet data exchange with other external equipment for supervision and other control system integration.

In one embodiment of the invention, one or more Data Relay Stations 500 are used to extend the wireless RF signal between the Speed Detection Unit 100 and the Remote Termination Station 400 where the distance between the two exceeds the radio range of either device (100 or 400), or when line-of-sight communication may be obscured. The Data Relay Station 500 also provides digital representations of the status and speed signals received wirelessly by WiFi transceiver 513. In one embodiment of the invention, a single Data Relay Station 500 provides wireless radio signal relay functionality and WiFi data capability for one or more Speed Detection Units 100.

In an embodiment of the invention, upon reception of the RF communication from a Speed Detection Unit 100, the Remote Termination Station 400 will adjust the wired status and analog speed signals according to the data received. A zero-speed fault state is assumed at a Speed Detection Unit 100 if it fails to transmit a signal or if the transmitted speed magnitude is below a user configured setting. The At-Speed (x) relay at the speed detection output 416 will be in a de-energized state when a zero-speed condition exists at the speed detection unit(x), where (x) represents the Speed Detection Unit 100 identification number when one or more units are in operation.

In an embodiment of the invention, both the Remote Termination Station 400 and the Data Relay Station 500 are provided with WiFi 418, 513 and wireless RF 412, 512 transceivers and respective antennae, 430, 530 and 420, 520 to support digital communication with each other and/or external devices to affect the exchange of Speed Detection Unit 100 data.

In an alternative embodiment of the invention, the Speed Detection Unit 100 can be attached to the sensor idler arm 600 to hold the outside circumference surface of the Speed Detection Unit 100 against a monitored moving linear surface 620 or rotating surface 630. See FIGS. 6A and B. The sensor idler arm 600 is attached to the idler arm mount 601 through the idler arm pivot bearing 604 allowing the idler arm 600 to swing freely on the mount 601. The Speed Detection Unit 100 is attached to the idler arm 600 through the sensor to arm bearing 605 allowing the Speed Detection Unit to spin freely from the idler arm 600. Tension spring 602 and idler arm dampener 603 supply holding force to insure the sensor surface coating 610 of the Speed Detection Unit 100 is held against the monitored moving linear surfaces 620 and rotating surfaces 630; providing sufficient friction needed to transfer motion from the monitored moving surfaces 620 and 630 to the Speed Detection Unit 100. This transfer of motion effectively rotates the Speed Detection Unit 100 which will then detect the motion state, moving or zero-speed, and relative speed of the monitored moving surfaces 620 and 630.

Figure 7:
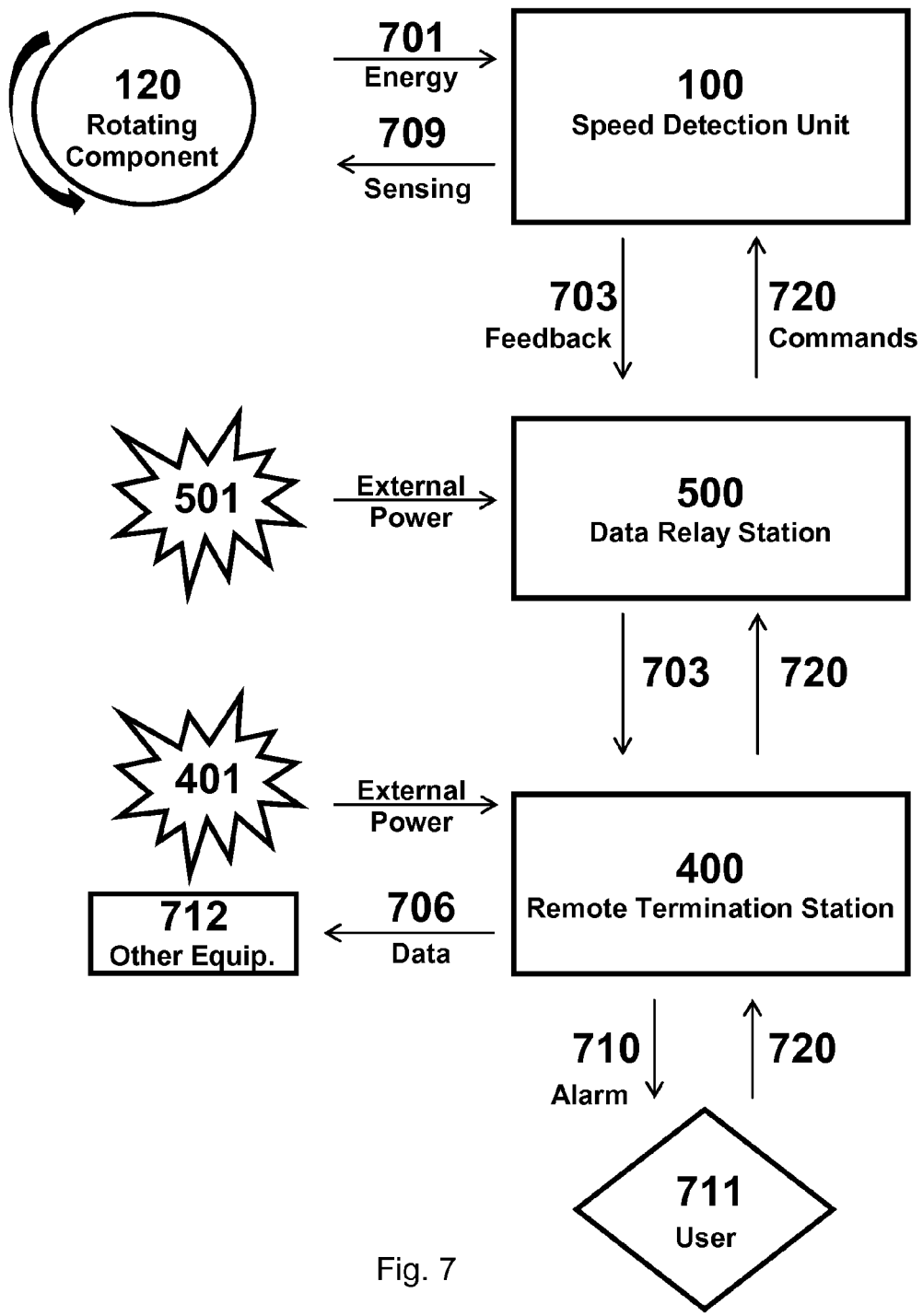
FIG. 7 is a flowchart depicting the interconnection of the Speed Detection Unit, Remote Termination Station and the Data Relay Station according to an embodiment of the present invention.

An embodiment of the invention is shown in the flowchart of FIG. 7 which depicts a mechanical rotational component 120 connected to a self-contained Speed Detection Unit 100 equipped with transceivers and circuitry which harvests energy 701 from the rotation of the mechanical rotational component 120. The Speed Detection Unit 100 senses and monitors 709 the speed or zero-speed of the mechanical rotational component 120. In an embodiment of the present invention, feedback 703 on the speed or zero-speed is then sent wirelessly to the optional one or more Data Relay Stations 500, powered by an external power source 501, which in turn transmits the data wirelessly to a Remote Termination Station 400 equipped with wireless transceivers and wired connections, and powered by an external power source 401. After processing the feedback 703, the Remote Termination Station 400 sends data, commands and operation parameters 706 through wired connections to other equipment 712 for fault detection or scaled real-time speed data.

In an embodiment of the present invention, the Remote Termination Station 400 sends an alarm notification 710 to alert the user 711 of the speed or cessation of speed using wired or wireless communication. A user 711 can adjust the operational parameters of the system and sends commands 720 from the Remote Termination Station 400 to the Data Relay Stations 500 and/or the Speed Detection Unit 100 using a graphical display and/or user interface located at the Remote Termination Station 400.

In an alternative embodiment, the Remote Termination Station 400 automatically adjusts the operational parameters and sends commands to the other equipment.

In an embodiment of the present invention, an angular speed sensing device comprising a fully self-contained energy harvesting electro-mechanical mechanism that provides internal electrical power for angular speed sensing; a control circuit to regulate harvested power and support data transmission; a speed sensor which measures the angular acceleration and speed of a rotating or moving surface.

In an embodiment of the present invention, an angular speed sensing device comprising a fully self-contained energy harvesting electro-mechanical mechanism that provides internal electrical power for angular speed sensing; a control circuit to regulate harvested power and support data transmission; a speed sensor which measures the angular acceleration and speed of a rotating or moving surface; a bi-directional wireless communication circuit that monitors the speed sensor, receives operational parameters and commands and transmits data to one or more remote receiving stations; an internal self-contained electrical power generator comprised of: a stator element, weighted to remain stationary, referenced to a spinning rotor element; a rotor element attached to the monitored rotating equipment through a single physical attachment point; and a fully enclosed mechanical system providing both stationary and rotating references using a single reference point connection.

In an embodiment of the present invention, an angular speed sensing device comprises a fully self-contained energy harvesting electro-mechanical mechanism that provides internal electrical power for angular speed sensing a control circuit to regulate harvested power and a speed sensor which measures one or both an angular acceleration and a speed of a rotating or moving surface.

In an embodiment of the present invention, an angular speed sensing device comprises a fully self-contained energy harvesting electro-mechanical mechanism that provides internal electrical power for angular speed sensing a control circuit to regulate harvested power and support data transmission a speed sensor which measures one or both an angular acceleration and a speed of a rotating or moving surface, a bi-directional wireless communication circuit that monitors the speed sensor, receives operational parameters and commands and transmits data to one or more remote receiving stations and an armature/stator type alternating current (AC) generator contained within the angular speed sensing device and used for energy harvesting.

In an embodiment of the present invention, an angular speed sensing device comprises a fully self-contained energy harvesting electro-mechanical mechanism that provides internal electrical power for angular speed sensing a control circuit to regulate harvested power and support data transmission a speed sensor which measures one or both an angular acceleration and a speed of a rotating or moving surface, a bi-directional wireless communication circuit that monitors the speed sensor, receives operational parameters and commands and transmits data to one or more remote receiving stations and an armature/stator type alternating current (AC) generator contained within the angular speed sensing device and used for energy harvesting, where the AC generator is driven by gears, chains or belts.

In an embodiment of the present invention, an angular speed sensing device comprises a fully self-contained energy harvesting electro-mechanical mechanism that provides internal electrical power for angular speed sensing a control circuit to regulate harvested power and support data transmission a speed sensor which measures one or both an angular acceleration and a speed of a rotating or moving surface, a bi-directional wireless communication circuit that monitors the speed sensor, receives operational parameters and commands and transmits data to one or more remote receiving stations, and a permanent magnet type direct current (DC) generator contained within and used for energy harvesting.

In an embodiment of the present invention, a speed sensing system used to detect a zero-speed condition of one or more external mechanical components comprising a remote termination station, a processor monitoring one or more sensing units, one or more sensing units measuring real-time speed and acceleration measurements of the one or more external mechanical components, the processor sensing real-time speed and acceleration measurements of the one or more external mechanical components.

In an embodiment of the present invention, a speed sensing system used to detect a zero-speed condition of one or more external mechanical components comprising a remote termination station, a processor monitoring one or more sensing units, one or more sensing units measuring real-time speed and acceleration measurements of the one or more external mechanical components, the processor transmitting real-time speed and acceleration measurements of the one or more external mechanical components to the remote termination station and the remote termination station providing electrical signal connections for fault and alarm notification upon a zero-speed condition where one or more wireless repeater stations are used to one or both extend transmission range and concentrate data from one or more sensor units.

In an embodiment of the present invention, a speed sensing system used to detect a zero-speed condition of one or more external mechanical components comprising a remote termination station, a processor monitoring one or more sensing units, one or more sensing units measuring real-time speed and acceleration measurements of the one or more external mechanical components, the processor transmitting real-time speed and acceleration measurements of the one or more external mechanical components to the remote termination station and the remote termination station providing electrical signal connections for fault and alarm notification upon a zero-speed condition, where sensor units utilize peer-to-peer wireless transmission store-and-forward techniques to deliver sensor data to base or repeater stations normally out of range of a sensor.

While the present invention has been described in some detail for purposes of clarity and understanding, one skilled in the art will appreciate that various changes in form and detail can be made without departing from the true scope of the invention. All figures, tables, and appendices, as well as patents, applications, and publications, referred to above, are hereby incorporated by reference.

What is claimed is:

1. A detachable angular speed sensing device comprising:
    a rotating hub with a single point of attachment to a rotating component, where the rotating hub has a single point of attachment and is integral only to the detachable angular speed sensing device;
    a fully self-contained energy harvesting electro-mechanical mechanism that provides internal electrical power;
    a control circuit to regulate harvested power and support data transmission;
    a speed sensor which measures one or both an angular acceleration and a speed of the rotating component; and
    a bi-directional wireless communication circuit that monitors the speed sensor, receives operational parameters and commands and transmits data to one or more remote receiving stations, where the detachable angular speed sensing device functions independent of the rotating component without secondary connections to the rotating component.

2. The detachable angular speed sensing device of claim 1, further comprising:
    a stator element weighted to remain stationary, where the stator element is referenced to the rotating hub; and
    a mechanical system providing both stationary and rotating references using the single point of attachment.

3. The detachable angular speed sensing device of claim 1, further comprising an internal battery used to permit the angular speed sensing device to operate at onset of motion.

4. The detachable angular speed sensing device of claim 1, where the speed sensor is independent of the control circuit.

5. The detachable angular speed sensing device of claim 1, further comprising a permanent magnet type direct current generator contained within and used for energy harvesting.

6. The detachable angular speed sensing device of claim 5, where the permanent magnet type direct current generator is driven by gears, chains or belts.

7. The detachable angular speed sensing device of claim 1, where the detachable angular speed sensing device is connected directly to rotating equipment to be monitored.

8. The detachable angular speed sensing device of claim 1, where the detachable angular speed sensing device is connected indirectly to a rotating or linear moving surface to be monitored.

9. The detachable angular speed sensing device of claim 1, where the detachable angular speed sensing device is connected to rotating equipment or moving surfaces using gears, drive chains or belts as linkages.

10. A speed sensing system used to detect a zero-speed condition of one or more external mechanical components comprising:
    a. a rotating hub with a single point of attachment connected directly to the speed sensing system;
    b. a rotor attached to the rotating hub;
    c. one or more sensing units measuring real-time speed and acceleration measurements of one or more external mechanical components including the rotating hub and the rotor;
    d. a processor monitoring the one or more sensing units, the processor transmitting real-time speed and acceleration measurements of the one or more external mechanical components to a remote termination station; and
    e. the remote termination station providing electrical signal connections for fault and alarm notification upon a zero-speed condition.

11. The speed sensing system of claim 10, where the processor utilizes wireless data transmission to transmit to the remote termination station.

12. The speed sensing system of claim 10, where the remote termination station provides one or more alerts selected from the group consisting of digital representation of speed measurement, an alarm condition through Ethernet messaging using wired or wireless connectivity and a fault condition through Ethernet messaging using wired or wireless connectivity.

13. A method of sensing and monitoring one or both a speed and a zero-speed of a mechanical component using an angular sensing device comprising:
 a. connecting a rotational surface of the mechanical component to a speed detection unit where the speed detection unit includes one or more transceivers, a generator and an electronic circuit;
 b. harvesting energy from rotation of the mechanical component by the generator and the electronic circuit to electrically power the speed detection unit;
 c. measuring an angular acceleration and speed or zero-speed of a rotating surface of the mechanical component, where the rotating surface has a single point of attachment to the angular sensing device;
 d. sending feedback on one or both the speed and the zero-speed of the mechanical component wirelessly to a remote termination station, where the remote termination station is equipped with wireless transceivers and wired connections, and powered by an external power source;
 e. processing the feedback at the remote termination station; and
 f. sending data, commands and operation parameters through the wired connections from the remote termination station to other equipment.

14. The method of claim 13, where the speed detection unit is self-contained.

15. The method of claim 13, further comprising a mechanical component with a moving surface.

16. The method of claim 13, further comprising using a data relay station to improve out-of-range transmissions between the speed detection unit and the remote termination station over extended or obscured distances.

17. The method of claim 13, further comprising sending an alarm notification to alert a user of the speed or a cessation of speed of the mechanical component.

18. The method of claim 13, further comprising using a graphical display and/or user interface to send the operational parameters and the commands from the remote termination station through the wired connections to other equipment.

19. The method of claim 13, further comprising equipping the speed detection unit with a rechargeable, internal battery or other power storage unit for use when the mechanical component is at zero-speed.

20. The method of claim 13, further comprising sending the data through a bi-directional wireless communications to the speed detection unit which then processes the data with built-in circuitry and controls or adjusts the speed or zero-speed computation of the mechanical component.

* * * * *